United States Patent [19]

Kawamura et al.

[11] Patent Number: 5,140,236
[45] Date of Patent: Aug. 18, 1992

[54] SPLINE INTERPOLATION METHOD

[75] Inventors: Hideaki Kawamura; Takao Sasaki, both of Hachioji; Toshiaki Otsuki, Hino, all of Japan

[73] Assignee: Fanuc Ltd., Minamitsuru, Japan

[21] Appl. No.: 476,488

[22] PCT Filed: Sep. 29, 1989

[86] PCT No.: PCT/JP89/01001
§ 371 Date: Jun. 6, 1990
§ 102(e) Date: Jun. 6, 1990

[87] PCT Pub. No.: WO90/04818
PCT Pub. Date: May 3, 1990

[30] Foreign Application Priority Data

Oct. 24, 1988 [JP] Japan ................. 63-267827

[51] Int. Cl.$^5$ ................ G05B 19/00; G06F 15/46
[52] U.S. Cl. ................ 318/568.1; 318/573; 318/571; 364/474.29; 901/9; 395/1
[58] Field of Search ................ 318/560–636; 364/513, 474.01–474.33

[56] References Cited

U.S. PATENT DOCUMENTS

| | | | |
|---|---|---|---|
| 4,529,921 | 7/1985 | Moribe | 364/513 X |
| 4,541,060 | 9/1985 | Kogawa | 364/513 |
| 4,550,383 | 10/1985 | Sugimoto | 364/513 |
| 4,663,726 | 5/1987 | Chand et al. | 364/474.31 X |
| 4,794,540 | 12/1988 | Gutman et al. | 364/474.29 |
| 4,797,835 | 1/1989 | Kurami et al. | 364/513 |
| 4,823,279 | 4/1989 | Perzley et al. | 364/513 |
| 4,831,547 | 5/1989 | Ishiguro et al. | 364/513 |
| 4,961,150 | 10/1990 | Seki et al. | 364/474.1 X |

Primary Examiner—Paul Ip
Attorney, Agent, or Firm—Staas & Halsey

[57] ABSTRACT

A spline interpolation method of subjecting given points to interpolation by using a cubic spline curve is provided. A first-derivative vector is derived from a preset number of points including a starting point ($P_1$), and a cubic equation between the starting point and a next point is derived based on the coordinate values of the preset points including the starting point ($P_1$) and the extreme point conditions of the starting point ($P_1$), to derive a spline curve between the starting point ($P_1$) and a point ($P_2$) next to the starting point ($P_1$). Next, the first-derivative vector at $P_2$ and a new next point are used instead of the starting point ($P_1$), to derive a cubic curve between $P_2$ and $P_3$. In this way, a cubic equation between points is sequentially derived to obtain a cubic spline curve, and as a result, a spline curve posing no practical problems can be obtained without previously receiving all of the sequential points, while sequentially receiving the sequential points in a forward direction.

8 Claims, 8 Drawing Sheets

$$[A] = \begin{bmatrix} 2 & 1 & 0 & 0 & 0 & \cdots & & & & & & 0 \\ 1 & 4 & 1 & 0 & 0 & 0 & \cdots & & & & & 0 \\ 0 & 1 & 4 & 1 & 0 & 0 & 0 & \cdots & & & & 0 \\ \vdots & & & & & & & & & & & \vdots \\ 0 & \cdots & & 0 & 0 & 0 & 1 & 4 & 1 & 0 \\ 0 & \cdots & & & 0 & 0 & 0 & 1 & 4 & 1 \\ 0 & \cdots & & & & 0 & 0 & 0 & 1 & 2 \end{bmatrix}$$

FIG. 4

$$[B] = \begin{bmatrix} 3(P_2 - P_1) \\ 3(P_3 - P_1) \\ 3(P_4 - P_2) \\ \vdots \\ 3(P_i - P_{i-2}) \\ \vdots \\ 3(P_n - P_{n-2}) \\ 3(P_n - P_{n-1}) \end{bmatrix}$$

FIG. 5

$$[A] = \begin{bmatrix} 1 & 0 & 0 & 0 & 0 & \cdots & & & & & & 0 \\ 1 & 4 & 1 & 0 & 0 & 0 & \cdots & & & & & 0 \\ 0 & 1 & 4 & 1 & 0 & 0 & 0 & \cdots & & & & 0 \\ \cdots & \cdots & \cdots & \cdots & \cdots & \cdots & \cdots & \cdots & \cdots & \cdots & \cdots & \cdots \\ 0 & \cdots & & & 0 & 0 & 0 & 1 & 4 & 1 & 0 & 0 \\ 0 & \cdots & & & & 0 & 0 & 0 & 1 & 4 & 1 \\ 0 & \cdots & & & & & 0 & 0 & 0 & 1 & 2 \end{bmatrix}$$

FIG. 6

$$[B] = \begin{bmatrix} P_1^{(1)} \\ 3(P_3 - P_1) \\ 3(P_4 - P_2) \\ \cdots \\ 3(P_i - P_{i-2}) \\ \cdots \\ 3(P_n - P_{n-2}) \\ 3(P_n - P_{n-1}) \end{bmatrix}$$

FIG. 7

$$[A]^{-1} = \begin{bmatrix} a_{1,1} & a_{1,2} & a_{1,3} & \cdots & a_{1,n} \\ a_{2,1} & a_{2,2} & a_{2,3} & \cdots & a_{2,n} \\ a_{3,1} & a_{3,2} & a_{3,3} & \cdots & a_{3,n} \\ \vdots & \vdots & \vdots & & \vdots \\ a_{n,1} & a_{n,2} & a_{n,3} & \cdots & a_{n,n} \end{bmatrix}$$

FIG. 8

$$[A]^{-1} = \begin{bmatrix} 0.11547*10^1 & -0.15470*10^0 & 0.41452*10^{-1} & -0.11107*10^{-1} & \cdots \\ -0.30940*10^0 & 0.30940*10^0 & -0.82904*10^{-1} & 0.22214*10^{-1} & \cdots \\ 0.82904*10^{-1} & -0.82904*10^{-1} & 0.29016*10^0 & -0.77749*10^{-1} & \cdots \\ -0.22214*10^{-1} & 0.22214*10^{-1} & -0.77749*10^{-1} & 0.28878*10^0 & \cdots \\ 0.59522*10^{-2} & -0.59522*10^{-2} & 0.20833*10^{-1} & -0.77379*10^{-1} & \cdots \\ \vdots & \vdots & \vdots & \vdots & \ddots \\ \cdots & -0.11107*10^{-1} & 0.41452*10^{-1} & -0.15470*10^0 & -0.15470*10^0 & 0.57735*10^0 \end{bmatrix}$$ ---- EQUATION (5)

FIG. 9

$$[A]^{-1} = \begin{bmatrix} 1.0 & 0 & 0 & 0 & \cdots \\ -0.26795 \times 10^{0} & 0.26795 \times 10^{0} & 0 & 0 & \cdots \\ 0.71797 \times 10^{-1} & -0.71797 \times 10^{-1} & -0.71797 \times 10^{-1} & 0.19238 \times 10^{-1} & \cdots \\ -0.19238 \times 10^{-1} & 0.19238 \times 10^{-1} & 0.28719 \times 10^{0} & -0.76915 \times 10^{-1} & \cdots \\ 0.51548 \times 10^{-2} & -0.51548 \times 10^{-2} & -0.76952 \times 10^{-1} & 0.28857 \times 10^{0} & \cdots \\ \vdots & \vdots & 0.20619 \times 10^{-1} & -0.77322 \times 10^{-1} & \cdots \\ \cdots & -0.11107 \times 10^{-1} & 0.41452 \times 10^{-1} & -0.15470 \times 10^{0} & \cdots \\ & & & & 0.57735 \times 10^{0} \end{bmatrix}$$
--- EQUATION (6)

FIG. 10

SPLINE INTERPOLATION METHOD

BACKGROUND OF THE INVENTION

1. Field of the Invention

The present invention relates to a spline interpolation method, and more particularly, to a spline interpolation method of effecting an approximate interpolation of a spline curve based on preset points among a sequence of given points.

2. Description of the Related Art

An interpolation us a cubic spline curve is widely used as a method of subjecting a sequence of points to interpolation by using a smooth curve.

The prior art spline interpolation is effected by the following method:

(ia) all of the specified points of the sequence are received;

(iia) simultaneous equations containing all of the sequence point data are created and solved, to derive the first-derivative vector at each point. This is effected by deriving the inverse matrix of a matrix equation described later;

(iiia) under a condition that the first-derivative vector at the second point and the first-derivative vector at the starting point derived as described above are used, and that the positions of a given starting point and a second point are set, the following cubic equation connecting the starting point and the second point is derived, and the calculation is effected to derive the respective positions, thus effecting the interpolation while the parameter t of the equation is changed from 0 to 1, $$P(t) = K_4 t^3 + K_3 t^2 + K_2 t + K_1$$

(where P(t) denotes a vector representing the position, and $K_4$, $K_3$, $K_2$ and $K_1$ denote coefficient vectors); and (iva) a cubic equation connecting the second and third points is derived in the same manner as described above.

Another method is effected as follows:

(ib) all of the specified points of the sequence are received;

(iib) simultaneous equations containing all of the sequence point data are created and solved, to derive the first-derivative vector at the starting point and the first-derivative vector at a second point, and derive the second-derivative vector at the starting point based on the above first-derivative vectors and the positions of the first and second points;

(iiib) a cubic equation, which is the same as described above and connects the starting point and the second point, is derived with the first-derivative vector and the second-derivative vector at the starting point derived as described above and used as the extreme point condition, and the calculation is effected to derive respective positions, thus effecting the interpolation while the parameter t of the equation is changed from 0 to 1; and (ivb) a cubic equation connecting the second and third points is derived with the first- and second-derivative vectors of the second point in the cubic equation as described above, and the calculation then effected in the same manner as described above to derive the respective positions, thus effecting the interpolation while the parameter t of the equation is changed from 0 to 1.

In the above-described methods, the calculations are repeatedly effected for the third and fourth points, the fourth and fifth points, and so on, to effect the interpolation of the cubic equation for all of the specified sequential points so that the spline interpolation for all the sequential points can be effected.

In the above methods, however, all the specified sequential points must be received and the calculation therefor effected, and accordingly, the following problems arise:

(a) it is impossible to limitlessly increase the number of specified points;

(b) a very large amount of matrix calculations must be effected when the number of specified points is large, and thus a large memory capacity and a long calculation time are required;

(c) if the matrix calculation is not effected with a high precision, the spline curve may become excessively separated from the succeeding specified points (deviated or oscillated); and (d) when the matrix calculation is effected on the programmer side, it is practically impossible to manually effect the calculation if the number of the specified points becomes equal to or larger than four, and thus an additional computing device becomes necessary.

SUMMARY OF THE INVENTION

The present invention has been made in view of the above problems, and an object thereof is to provide a spline interpolation method of effecting an approximate interpolation of a spline curve based on preset points among a sequence of given points.

In this invention, to solve the problem described above, a spline interpolation method is provided in which given points are subjected to an interpolation using a cubic spline curve, and is characterized by deriving a first-derivative vector based on a preset number of points including a starting point, deriving a cubic equation between the starting point and a next point based on the coordinate values of the preset points including the starting point, the extreme point condition of the starting point, and the first-derivative vector, to derive a spline curve between the starting point and a point next to the starting point, and using a new point instead of the starting point and sequentially deriving a cubic equation between the points, to thereby derive a cubic spline curve.

First, a preset number of points starting from the starting point are used to derive a cubic spline curve, then a cubic spline curve is derived by using a new point instead of an initial point, and accordingly, a spline curve between points is sequentially derived to effect the spline interpolation process.

Therefore, the spline interpolation process can be effected without practical problems by sequentially receiving points in a forward direction without previously receiving all of the sequential points.

DESCRIPTION OF THE PREFERRED EMBODIMENT

An embodiment of the present invention will now be described with reference to the accompanying drawings.

First, a feature of this invention is described. Attention is paid to the fact that, in the step of "deriving the first-derivative vector at each point based on all of the sequential points" in the conventional method (iia) of deriving a spline curve, a point among all of the sequential points nearer to a corresponding point at which the first-derivative vector is to be derived has a larger influence on the first-derivative vector, and the first-derivative vector at the corresponding point is approximately derived based on a sequence of points among all of the sequential points and nearer to the corresponding point, to create a cubic equation and effect the spline interpolation.

Further, a practical spline curve interpolation can be attained according to the following process, for example, set as the condition given in the starting point.

(a) Only a desired sequence of points is given and the second-derivative vector at the starting point is set to 0.

(b) The first-derivative vectors at the starting point and the desired sequential points are given.

Next, the principle of the present invention is described.

Figure 1:
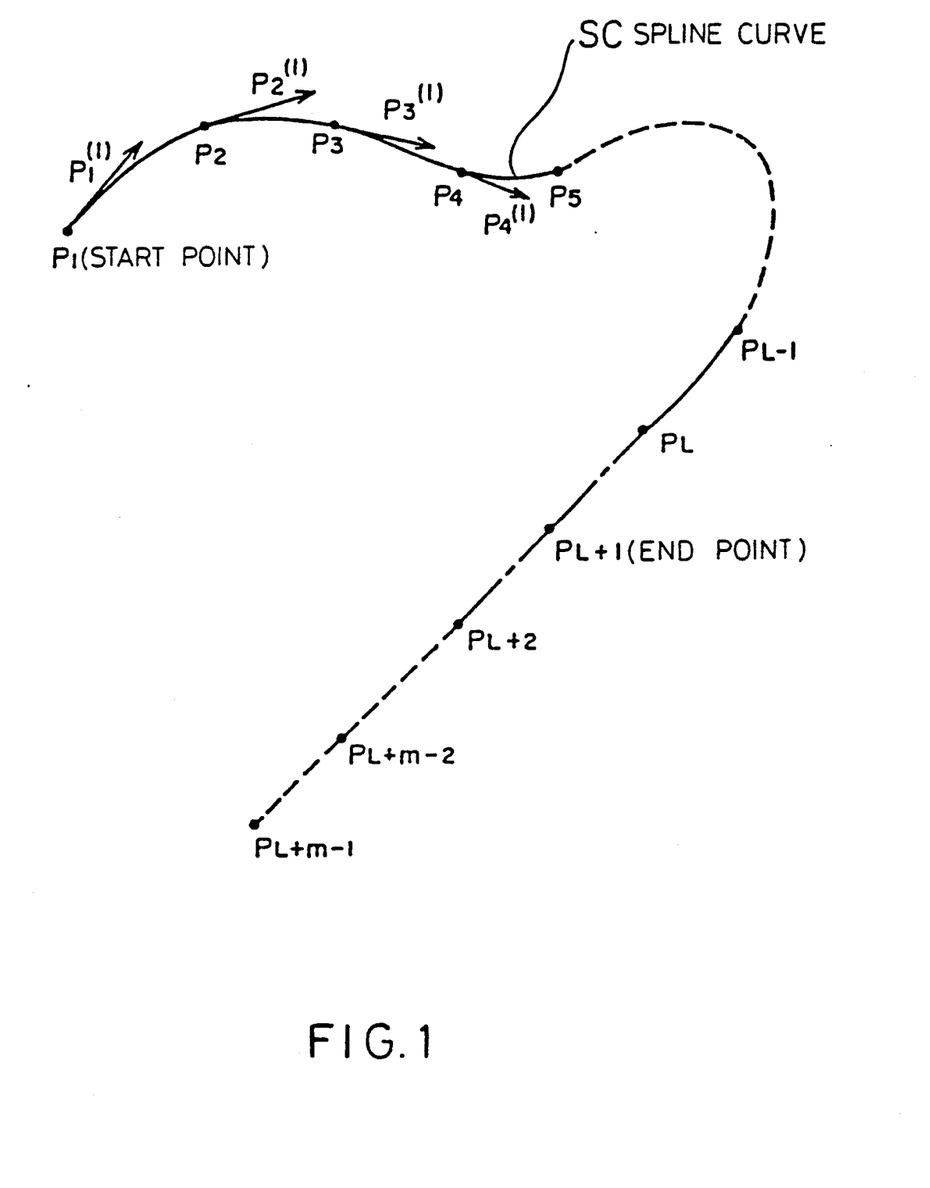
FIG. 1 is a diagram showing a spline curve.

FIG. 1 shows a sequence of points subjected to a spline interpolation and a spline curve. Points $P_1$ to $P_L$ indicate a sequence of points in which point $P_1$ is a starting point, point $P_L$ is an end point, and points $P_{L+1}$ to $P_{L+m-1}$ are auxiliary points used for effecting an interpolation near the end point $P_L$. $P_1^{(1)}$ to $P_4^{(1)}$ indicate first-derivative vectors and SC is a spline curve.

(1) First-derivative vector

The first-derivative vector at each point of a cubic spline curve passing all of the sequential points $P_1$ to $P_n$ (n points) is generally derived as follows.

A cubic equation constituting the spline curve is generally shown by the following equation:

$$P(t) = K_4 t^3 + K_3 t^2 + K_2 t + K_1 \quad (1)$$

where P(t) is a position vector which varies according to the parameter t, and $K_4$, $K_3$, $K_2$ and $K_1$ are coefficient vectors. That is, when an XYZ coordinate is used, $P(t) = (x(t), y(t), z(t))$ and $K_i = (K_{ix}, K_{iy}, K_{iz})$ (where i = 1, 2, 3 or 4). The parameter t is determined such that $0 \leq t \leq 1$.

Accordingly, the first-derivative vector $P^{(1)}$ is expressed as follows:

$$P^{(1)}(t) = 3K_4 t^2 + 2K_3 t + K_2 \quad (2)$$

At this time, the first-derivative vector $[P^{(1)}]$ at each point can be expressed by the following equation:

$$[A][P^{(1)}] = [B] \quad (3)$$

Further, the matrix $[P^{(1)}]$ of the first-derivative vector is a matrix of n rows × 1 column expressed by $$[P^{(1)}] = \begin{bmatrix} P_1^{(1)} \\ P_2^{(1)} \\ \cdot \\ \cdot \\ \cdot \\ P_n^{(1)} \end{bmatrix}$$

and $P_1^{(1)}$ to $P_n^{(1)}$ are first-derivative vectors at $P_1$ to $P_n$.

At this time, it is generally known that the matrices [A] and [B] can be expressed as follows, according to the extreme point condition.

(i) In the case of the first extreme point condition:

(a) The second-derivative vector at the starting point ($P_1$) is 0.

(b) The second-derivative vector at the end point ($P_n$) is 0.

Figure 4:
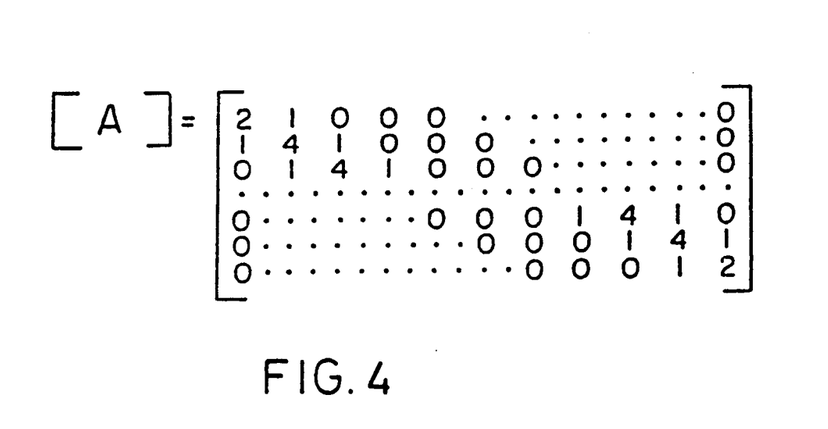
FIG. 4 is a diagram showing the construction of a matrix [A]
Figure 5:
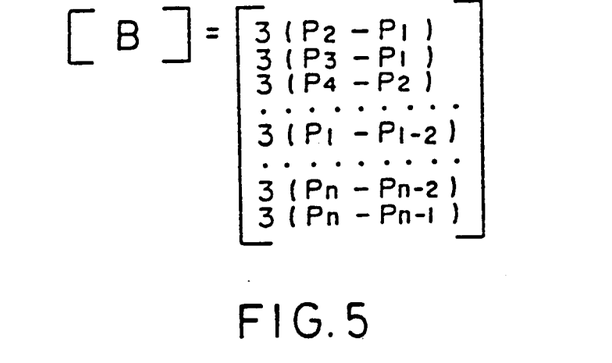
FIG. 5 is a diagram showing the construction of a matrix [B]

At this time, the matrix [A] is expressed by n rows × n columns, as shown in FIG. 4, and the matrix [B] is expressed by n rows × 1 column, as shown in FIG. 5.

(ii) In the case of the second extreme point condition:

(a) The first-derivative vector $P_1^{(1)}$ at the starting point ($P_1$) is given.

(b) The second-derivative vector at the end point ($P_n$) is 0.

Figure 6:
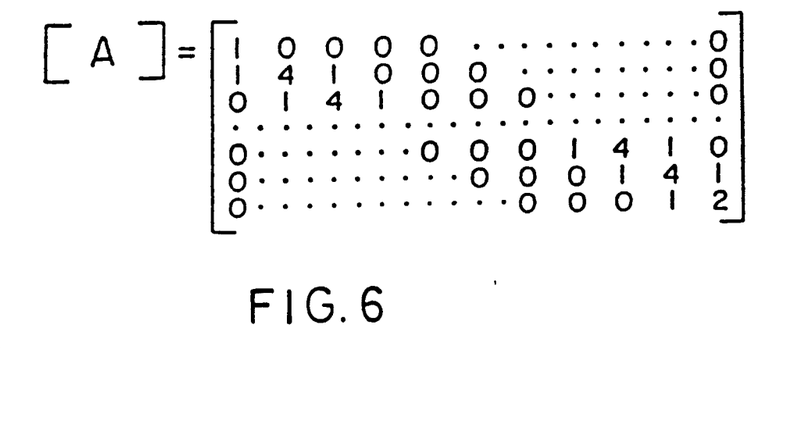
FIG. 6 is a diagram showing the construction of another matrix [A]
Figure 7:
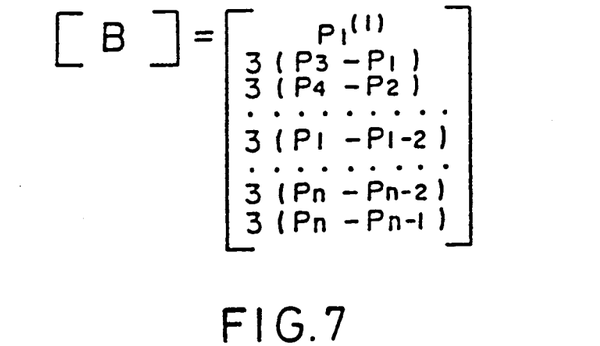
FIG. 7 is a diagram showing the construction of another matrix [B]

At this time, the matrix [A] is expressed by n rows × n columns, as shown in FIG. 6, and the matrix [B] is expressed by n rows × 1 column, as shown in FIG. 7.

From the equation (3), $[P^{(1)}]$ can be derived by $[P^{(1)}] = [A]^{-1}[B]$. The matrix $[A]^{-1}$ is expressed by n rows × n columns, as shown in FIG. 8.

Figure 8:
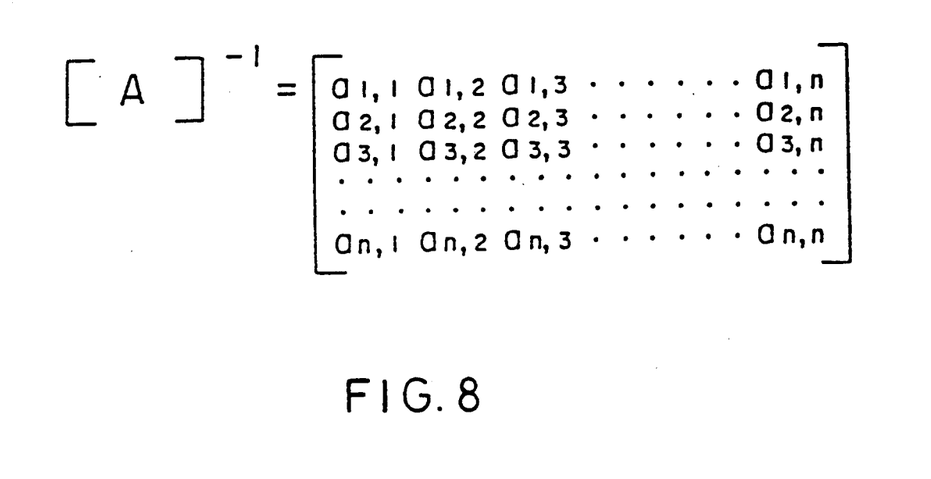
FIG. 8 is a diagram showing the general construction of a matrix $[A]^{-1}$.

At this time, the absolute values of elements of the matrix $[A]^{-1}$ shown in FIG. 8 are large in the diagonal elements ($a_{k,k}$ k = 1 to n) and become smaller in the elements which are farther away. Further, the matrix is a fixed matrix set by the extreme point condition.

Figure 9:
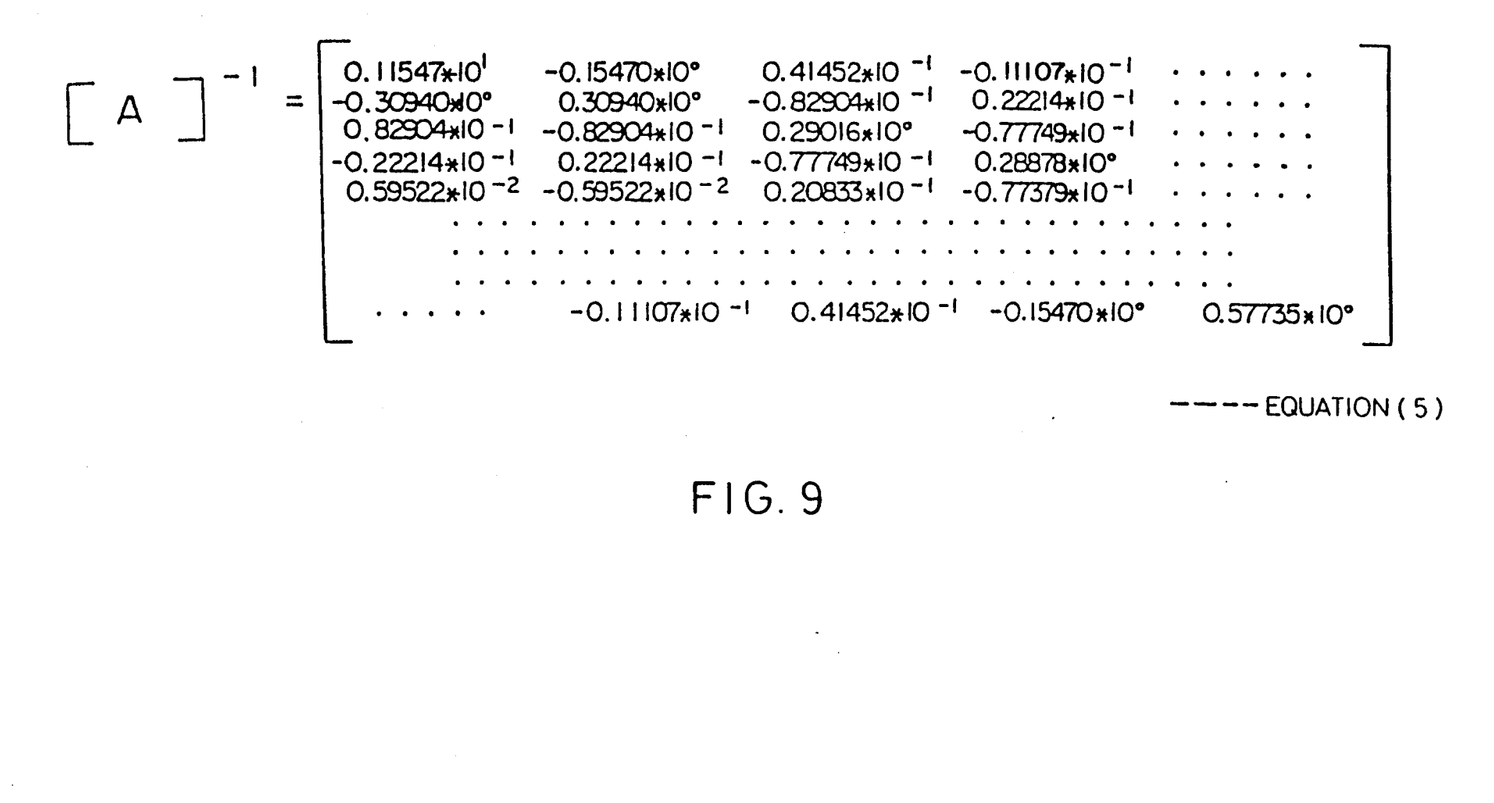
FIG. 9 is a diagram showing the concrete construction of a matrix $[A]^{-1}$.
Figure 10:
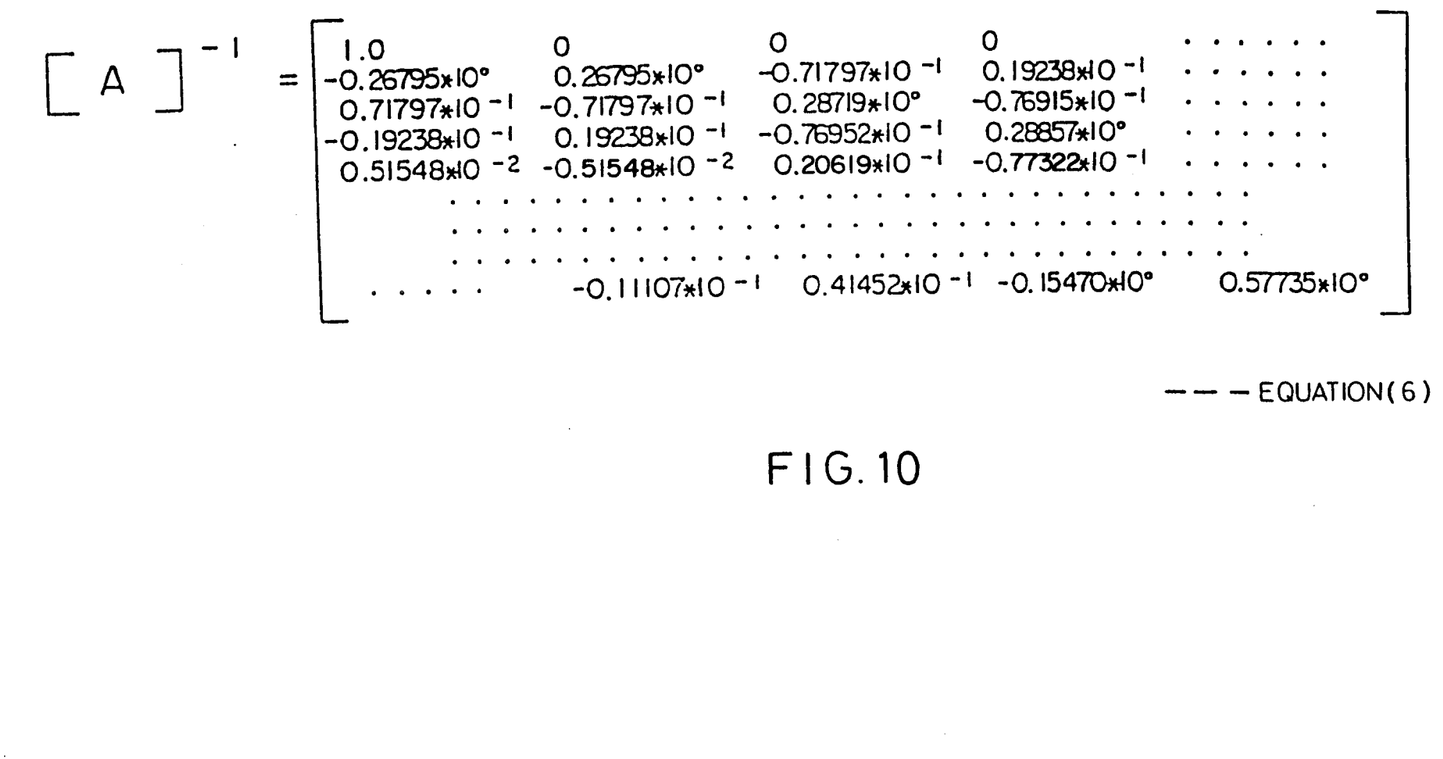
FIG. 10 is a diagram showing the concrete construction of another matrix $[A]^{-1}$.

Concretely, the matrix shown by an equation (5) of FIG. 9 is obtained when n is set at 50 in the extreme point condition 1. Further, the matrix shown by an equation (6) of FIG. 10 is obtained when n is set at 50 in the extreme point condition 2.

Approximation of the first-derivative vector

From the above-described theory, the first-derivative vector $P_1^{(1)}$ can be approximated as follows:

$$P_i^{(1)} = a_{i,i-k} * b_{i-k} (i - k \geq 1) + a_{i,i-k+1} * b_{i-k+1} \ldots + \quad (7)$$

$$a_{i,i} * b_i \text{ (diagonal term)} \ldots + a_{i,i+k-1} * b_{i+k-1} +$$

$$a_{i,i+k} * b_{i+k} (i + k \leq n)$$

(the precision of the approximation is enhanced as k is made larger).

In this case, $b_i$ is an i-th element of the matrix [B]. Based on this, $P_i^{(1)}$ can be derived without using all of the elements of [B], i.e., without using all of the sequential points.

FORMATION OF A CUBIC EQUATION AND INTERPOLATION

If the first-derivative vector $P_i^{(1)}$ at $P_i$ can be obtained, the following conditional equations can be derived by applying the points $P_i$ and $P_i^{(1)}$ to the equations (1) and (2):

$$P_i = P_i(0) = K_{i1} \quad (8)$$

$$P_i^{(1)} = P_i^{(1)}(0) = K_{i2} \quad (9)$$

$$P_{i+1} = P_i(1) = K_{i4} + K_{i3} + K_{i2} + K_{i1} \quad (10)$$

$$P_{i+1}^{(1)} = P_i^{(1)}(1) = 3K_{i4} + 2K_{i3} + K_{i2} \quad (11)$$

(where $P_i(0)$ and $P_i(1)$ are values of $P_i(t)$ when $t=0$ and $t=1$ where $P(t)$ in the equation (1) is applied to $P_i$ to $P_{i+1}$, and $K_{i4}$, $K_{i3}$, $K_{i2}$ and $K_{i1}$ are respective coefficients of $t^3$, $t^2$, $t^1$ and $t^0$ in $P_i(t)$. Further, $P_i^{(1)}(0)$ and $P_i^{(1)}(1)$ are values of the first-derivative vector when $t=0$ and $t=1$).

From the above four equations, four coefficients $K_{i4}$, $K_{i3}$, $K_{i2}$ and $K_{i1}$ can be obtained.

In this way, $P_i(t)$ is sequentially derived and connected to create a spline curve.

When a cubic equation is derived by the above method, errors of $P_i^{(1)}$ and $P_i^{(2)}$ with respect to the theoretical values thereof are not accumulated, and thus the errors can be suppressed to a negligible small value by adequately setting k in the equation (7). Therefore, a spline curve which poses no practical problems can be derived from the spline curve obtained by the present method, without enlarging the errors with respect to a spline curve obtained theoretically from a sequence of given points.

CONCRETE EXAMPLE

Next, a case wherein a spline curve is created by effecting the interpolation up to a point $P_i$ and deriving the first-derivative vector $P_{i+1}^{(1)}$ at a next point is explained as a concrete example of the present method.

CREATION OF A FIRST CUBIC EQUATION

First, a first cubic equation is created and subjected to interpolation.

(i) $P_1$ to $P_{1+m}$ ((m+1) points; m is a constant and (m+1) is a number of buffers for receiving them) are received.

(ii) Assuming that $P_1$ is followed by a countless number of points, $P_2^{(1)}$ is derived from the equation (7).

(a) When the second-derivative vector $P_1^{(2)}$ is 0 at the starting point, $P_2^{(1)}$ is derived as follows by using the second row in the matrix of the equation (5), since the matrix obtained when assuming that $P_1$ is followed by a countless number of points is substantially equal to the matrix of the equation (5).

$$P_2^{(1)} = -0.30940 * 10^0 * 3(P_2 - P_1) +$$
$$0.30940 * 10^0 * 3(P_3 - P_1)(\text{diagonal term}) -$$
$$0.82904 * 10^{-1} * 3(P_4 - P_2) + 0.22214 * 10^{-1} * 3(P_5 - P_3) \ldots +$$
$$a_{2,m} * 3(P_{m+1} - P_{m-1})$$

(b) Where the first-derivative vector $P_1^{(1)}$ is given at the starting point, $P_2^{(1)}$ is derived as follows by using the second row in the matrix of the equation (6) since the matrix obtained when assuming that $P_1$ is followed by a countless number of points is substantially equal to the matrix of the equation (6).

$$P_2^{(1)} = -0.26795 * 10^0 * P_1^{(1)} +$$
$$0.26795 * 10^0 * 3(P_3 - P_1)(\text{diagonal term}) -$$
$$0.71797 * 10^{-1} * 3(P_4 - P_2) + 0.19238 * 10^{-1} * 3(P_5 - P_3) \ldots +$$
$$a_{2,m} * 3(P_{m+1} - P_{m-1})$$

(iii) $P_1 = P(0) = K_1 \quad (12)$

The following condition (a) or (b) is used according to the extreme point condition:

(a) Where the second-derivative vector $P_1^{(2)}$ is 0 at the starting point, $$P_1^{(2)} = 0 \text{ or } 2K_3 = 0 \quad (13)\text{-}1$$

(b) Where the first-derivative vector $P_1^{(1)}$ is given at the starting point, $$P_1^{(1)} = P^{(1)}(0) = K_2 \quad (13)\text{-}2$$

$$P_2 = P(1) = K_4 + K_3 + K_2 + K_1 \quad (14)$$

$$P_2^{(1)} = P^{(1)}(1) = 3K_4 + 2K_3 + K_2 \quad (15)$$

Coefficients $K_4$, $K_3$, $K_2$ and $K_1$ are derived from the four conditional equations (12), (13), (14) and (15), to create a cubic equation, and the cubic equation is subjected to interpolation.

CREATION OF SECOND AND LATER CUBIC EQUATION

Next, a second or later cubic equation (i-th; i>=2) is created and is subjected to interpolation.

(i) $P_{i+m}$ is received (a state is set up in which (m+1) points $P_i$ to $P_{i+m}$ are received).

(ii) Assuming that a spline curve on which $P_i$ is followed by a countless number of points is given, an approximate tangential vector $P_{i+1}^{(1)}$ at the second point on the curve is derived by using the equation (7). $P_{i+1}^{(1)}$ is derived as follows, using the second row in the matrix of the equation (6), since the matrix obtained when assuming that $P_1$ is followed by a countless number of points is substantially equal to the matrix of the equation (6).

$$P_{i+1}^{(1)} = -0.26795 * 10^0 * P_i^{(1)} +$$
$$0.26795 * 10^0 * 3(P_{i+2} - P_i)(\text{diagonal term}) -$$
$$0.71797 * 10^{-1} * 3(P_{i+3} - P_{i+1}) +$$
$$0.19238 * 10^{-1} * 3(P_{i+4} - P_{i+2}) \ldots +$$
$$a_{2,m} * 3(P_{i+m} - P_{i+m-2})$$

(iii) $P_i = P_i(0) = K_1$ $$P_i^{(1)} = P_i^{(1)}(0) = K_2$$

($P_i^{(1)}$ has been derived by the spline curve up to $P_i$)

$$P_{i+1} = P_i(1) = K_4 + K_3 + K_2 + K_1$$

$$P_{i+1}^{(1)} = P_{i+1}^{(1)}(1) = 3K_4 + 2K_3 + K_2$$

Coefficients $K_4$, $K_3$, $K_2$ and $K_1$ are derived from the above conditional equations to create a cubic equation, and the cubic equation is subjected to interpolation.

(3) When the end point $P_L$ is reached, the process (2) is repeatedly effected to sequentially create cubic equations between points $P_{L-m}$ to $P_L$ while auxiliary $P_L$, $P_{L+1}, \ldots, P_{L+m-1}$ are created.

In this case, $$P_{L+1} - P_L = P_{L+2} - P_{L+1} = \cdots$$
$$= P_{L+m-1} - P_{L+m-2}$$
$$= P_L - P_{L-1}$$

FLOWCHART

Figure 2:
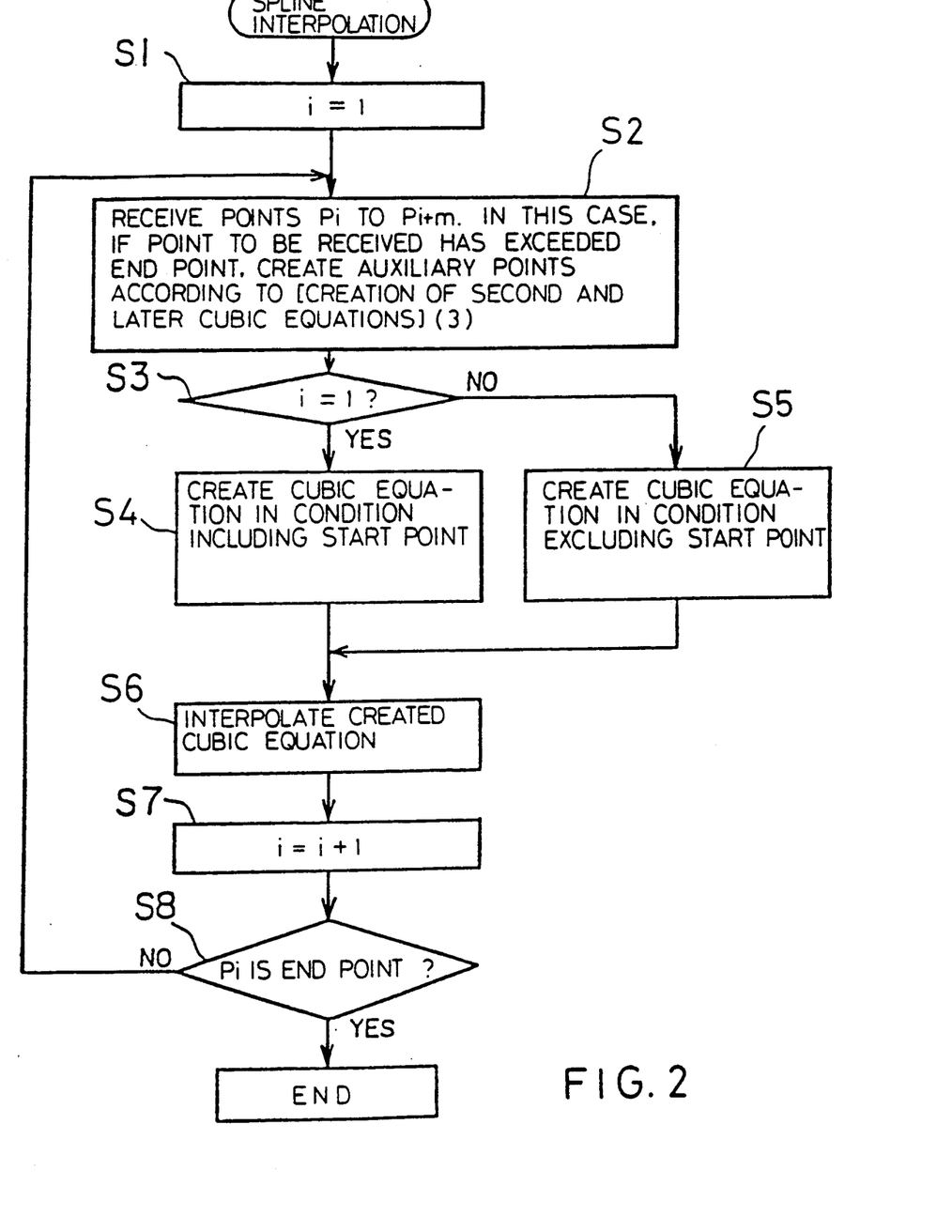
FIG. 2 is a flowchart showing the process for deriving a spline curve in the present invention.

The processing flowchart of the present invention is shown in FIG. 2. In FIG. 2, each numeral following S denotes a step number.

[S1] Set i to 1.

[S2] Receive points $P_i$ to $P_{i+m}$. Make (m+1) points by creating auxiliary points when a point to be received has exceeded the end point.

[S3] Execute S4 when i=1, i.e., the starting point is specified; and execute S5 when a point other than the starting point is specified.

[S4] Create a cubic equation under a condition including the starting point.

[S5] Create a cubic equation under a condition excluding the starting point.

[S6] Derive coefficients of the created cubic equation and effect the interpolation between points by using the cubic equation.

[S7] Increment i by 1 and effect the interpolation for a next cubic equation between points.

[S8] Determine whether or not $P_i$ is an end point, and if it is not the end point, the process returns to S2 and the interpolation is continuously effected.

CONSTRUCTION OF HARDWARE

Figure 3:
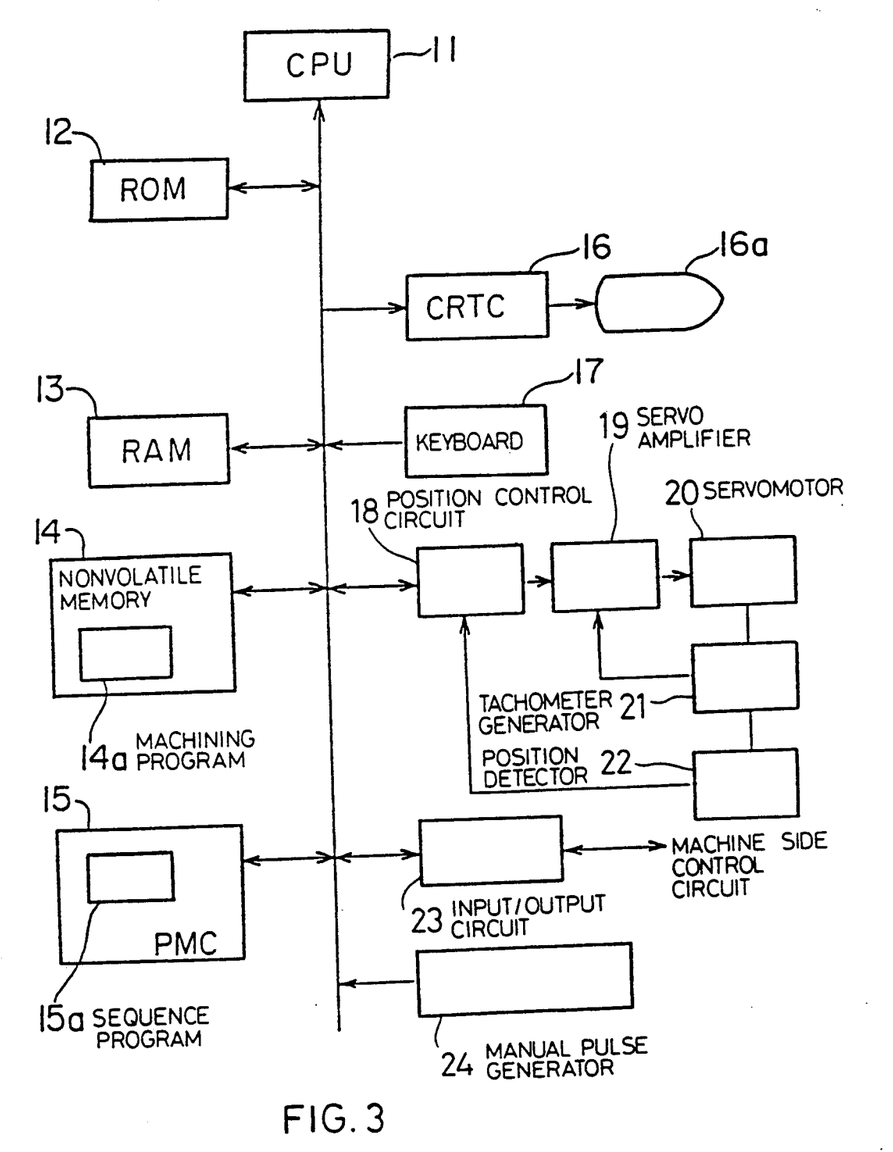
FIG. 3 is a block diagram of a numerical control device for effecting the present invention.

FIG. 3 shows the construction of the hardware of a numerical control device (CNC) for effecting the present invention. In FIG. 3, 11 denotes a processor for global control (CPU), 12 denotes a ROM in which a control program and the like used for deriving a spline curve are stored, 13 denotes a RAM for storing interim data and the like of a point on the spline curve, and 14 denotes a nonvolatile memory in which the derived spline curve, machining program, parameters and the like are stored. Numeral 14a denotes a machining program.

Numeral 15 denotes a PMC (programmable machine controller) which receives instructions such as M-function and T-function, converts them into signals for controlling the machine tool, and outputs the same. The M-function and the like are processed according to a sequence program 15a and then supplied from an input-/output circuit to a control circuit on the machine side. Numeral 16 denotes a display control circuit which converts a digital signal into a display signal; 16a denotes a display unit, which can be a CRT, liquid crystal display device or the like; and 17 denotes a keyboard used for inputting various data.

Numeral 18 denotes a position control circuit for controlling a servomotor; 19 denotes a servo amplifier for controlling the speed of the servomotor; 20 denotes the servomotor; 21 denotes a tachometer generator for effecting the speed feedback; and 22 denotes a position detector, which can be a pulse coder, optical scale or the like. The above elements must be provided in a number corresponding to the number of axes, but in this case, the elements for only one axis are shown.

Numeral 23 denotes an input/output circuit for transferring digital signals with respect to the external unit, and a tool select signal (T-signal) for controlling the replacement of tools is output from the circuit to the machine-side control circuit. Numeral 24 denotes a manual pulse generator for moving each axis in a digital manner.

In the above construction, a single processor is used, but it is also possible to use a processor for global control and a processor for deriving a spline curve, thus constructing a multi-processor. Further, it is possible to add a co-processor or the like to enhance the operation speed.

Further, an automatic programming device other than the numerical control device can be applied to carry out the spline interpolation method of this invention.

As described above, according to the present invention, since a cubic spline curve between points is sequentially derived based on a preset number of points among a sequence of given points, a practical spline curve can be derived in a short period of time even when the number of points to be interpolated becomes larger.

Further, the extreme point condition is set with the second-derivative vector set at 0, so that the interpolation of the spline curve can be effected without setting the condition of the first-derivative vector at the extreme point or the starting point.

In addition, a smooth spline curve can be obtained near the end point by providing auxiliary points after the end point.

We claim:

1. A spline interpolation method for performing machining according to sequentially created cubic spline curves by subjecting given points to interpolation using the cubic spline curves, comprising the steps of:

deriving a first-derivative vector from a preset number of points including a starting point;

deriving a first cubic equation between said starting point and a next point based on coordinate values of the preset number of points including said starting point, an extreme point condition of said starting point and said first-derivative vector, to derive a first cubic spline curve between said starting point and a point next to said starting point;

using a new point instead of said starting point and sequentially deriving a second cubic equation between points, to thereby derive a second cubic spline curve; and performing machining in accordance with the first and second cubic spline curves.

2. A spline interpolation method according to claim 1, wherein the cubic spline curve is subjected to interpolation in said extreme point condition in which second-derivative vectors at said starting point and an end point are set at 0.

3. A spline interpolation method according to claim 1, wherein the cubic spline curve is subjected to interpolation in said extreme point condition in which the first-derivative vector at the starting point is given and a second-derivative vector at an end point is set at 0.

4. A spline interpolation method according to claim 1, characterized in that the cubic spline curve near an end point is derived by using auxiliary points after the end point.

5. A spline interpolation method for performing machining according to sequentially created cubic spline curves by subjecting given points to interpolation using the cubic spline curves, comprising the steps of:

deriving a first-derivative vector from a preset number of points including a starting point;

deriving a first cubic equation between said starting point and a next point including said starting point, an extreme point condition of said starting point and said first-derivative vector, to derive a first spline curve between said starting point and a point next to said starting point;

using a new point instead of said starting point and sequentially deriving a second cubic equation between points, to thereby derive a second cubic spline curve;

distributing interpolation pulses in accordance with the cubic spline curves;

driving servo motors with the interpolation pulses; and performing machining along the cubic spline curve.

6. A spline interpolation method according to claim 5, wherein the cubic spline curve is subjected to interpolation ins aid extreme point condition in which second-derivative vectors at said starting point and an end point are set at 0.

7. A spline interpolation method according to claim 5, wherein the cubic spline curve is subjected to interpolation in said extreme point condition in which the first-derivative vector at the starting point is given and a second-derivative vector at an end point is set at 0.

8. A spline interpolation method according to claim 5, characterized in that the cubic spline curve near an end point is derived by using auxiliary points after the end point.

* * * * *

UNITED STATES PATENT AND TRADEMARK OFFICE
CERTIFICATE OF CORRECTION

PATENT NO. : 5,140,236
DATED : August 18, 1992
INVENTOR(S) : Kawamura et al.

It is certified that error appears in the above-identified patent and that said Letters Patent is hereby corrected as shown below:

Col. 1, line 12, "us" should be --method using--;

Col. 6, line 47, "$P_{i+1}^{(1)}$" should be --$P_{i+1}^{(1)}$--; and

"$P_i^{(1)}$" should be --$P_i^{(1)}$--.

*Col. 10, line 6, "ins aid" should be --in said--.

Signed and Sealed this

Twenty-first Day of September, 1993

Attest:

BRUCE LEHMAN

Attesting Officer          Commissioner of Patents and Trademarks